(12) United States Patent
Biercuk et al.

(10) Patent No.: US 9,946,973 B2
(45) Date of Patent: Apr. 17, 2018

(54) LONG-TIME LOW-LATENCY QUANTUM MEMORY BY DYNAMICAL DECOUPLING

(71) Applicants: The University of Sydney, Sydney (AU); Trustees of Dartmouth College, Hanover, NH (US)

(72) Inventors: Michael J. Biercuk, Sydney (AU); Kaveh Khodjasteh, Sydney (AU); Lorenza Viola, Sydney (AU)

(73) Assignees: The University of Sydney, Sydney (AU); Trustees of Dartmouth College, Hanover, NH (US)

( * ) Notice: Subject to any disclaimer, the term of this patent is extended or adjusted under 35 U.S.C. 154(b) by 574 days.

(21) Appl. No.: 14/409,411

(22) PCT Filed: Jun. 18, 2013

(86) PCT No.: PCT/AU2013/000649
§ 371 (c)(1),
(2) Date: Dec. 18, 2014

(87) PCT Pub. No.: WO2013/188910
PCT Pub. Date: Dec. 27, 2013

(65) Prior Publication Data
US 2015/0324705 A1   Nov. 12, 2015

(30) Foreign Application Priority Data
Jun. 18, 2012  (AU) ................................ 2012902541

(51) Int. Cl.
*G06N 99/00*   (2010.01)
*G06F 3/06*   (2006.01)
*B82Y 10/00*   (2011.01)

(52) U.S. Cl.
CPC ............ *G06N 99/002* (2013.01); *B82Y 10/00* (2013.01); *G06F 3/061* (2013.01); *G06F 3/0656* (2013.01); *G06F 3/0673* (2013.01)

(58) Field of Classification Search
None
See application file for complete search history.

(56) References Cited

FOREIGN PATENT DOCUMENTS

WO   WO-2009/117003   9/2009
WO   WO-2013/188910   12/2013

OTHER PUBLICATIONS

Zhang et al., Long-time electron spin storage via dynamical suppression of hyperfine-induced decoherence in a quantum dot, 2008, Physical Review B, 77, 125336, pp. 1-15.*

(Continued)

*Primary Examiner* — Alan Chen
(74) *Attorney, Agent, or Firm* — Schwegman Lundberg & Woesner, P.A.

(57) ABSTRACT

This disclosure relates to preserving a quantum state in a quantum memory. A controller of the quantum memory determines based on a characteristic of noise that causes deterioration of the quantum state a dynamical decoupling base sequence. The duration of the base sequence is shorter than or equal to an access latency time of the quantum memory to allow access to the quantum state within the access latency time. Further, the deterioration of the quantum state is bounded to an upper deterioration limit when the base sequence is repeatedly applied to the quantum system. This provides acceptable access times while simultaneously allowing long term storage of data in the quantum state with low error rates. Repeatedly applying the base sequence to the quantum system will first yield an increasing deterioration but that deterioration will eventually reach the upper (Continued)

limit. As a result, over time the error rates will not exceed that upper limit and the quantum state is stable.

18 Claims, 5 Drawing Sheets

(56) References Cited

OTHER PUBLICATIONS

Viola et al., Universal Control of Decoupled Quantum Systems, Dec. 6, 1999, Physical Review Letters, 83, 23, pp. 4888-4891.*
"International Application No. PCT/AU2013/000649, International Search Report and Written Opinion dated Jul. 3, 2013", (Jul. 3, 2013), 8 pgs.
Ajoy, Ashok, et al., "Optimal pulse spacing for dynamical decoupling in the presence of a purely-dephasing spin-bath", Phys. Rev. A 83, 032303/1-14 (2012), (2012), 15 pgs.
Almog, Ido, et al., "Direct measurement of the system-environment coupling as a tool for understanding decoherence and dynamical decoupling", J. Mod. Phys. 44, 154006/1-9 (2011), (2011), 1-9.
Alvarez, Gonzalo A., et al., "Iterative rotation scheme for robust dynamical decoupling", Phys. Rev. A 85, 052324/1-9 (2012), (2012), 1-9.
Barthel, C., et al., "Interlaced Dynamical Decoupling and Coherent Operation of a Singlet-Triplet Qubit", Phys. Rev. Lett. 105, 266808/1-4 (2010), (2010), 1-4.
Biercuk, M. J., et al., "Dynamical decoupling sequence construction as a filter-design problem", J. Phys. B 44, 154002/1-7 (2011), (2011), 29 pgs.
Biercuk, Michael J., et al., "Optimized dynamical decoupling in a model quantum memory", Nature, vol. 458/23, pp. 996-1000, Apr. 2009. Retrieved from the internet <http://tf.boulder.nist.gov/general/pdf/2349.pdf> on Jul. 2, 2013, (Apr. 2009), 996-1000.
Biercuk, Michael J., et al., "Phenomenological Study of Decoherence in Solid-State Spin Qubits due to Nuclear Spin Diffusion", Phys. Rev. B 83, 235316/1-10 (2011), (2011), 1-10.
Bluhm, Hendrik, et al., "Dephasing time of GaAs electron-spin qubits coupled to a nuclear bath exceeding 200 μs", Nature Phys. 7, 109-113 (2011), (2011), 109-113.
Cywinski, Lukasz, et al., "How to Enhance Dephasing Time in Superconducting Qubits", Phys. Rev. B 77, 174509/1-11 (2008), (2008), 12 pgs.
De Lange, G., et al., "Universal dynamical decoupling of a single solid-state spin from a spin bath", Science 330, 60-63 (2010), (2010), 16 pgs.
Duan, L. M., et al., "Colloquium: Quantum networks with trapped ions", Rev. Mod. Phys. 82, 1209-1224 (2010), (2010), 1209-1224.
Duan, Lu-Ming, et al., "Reducing decoherence in quantum computer memory with all quantum bits coupling to the same environment", Phys. Rev. A 57, 737-741 (1998), (1998), 14 pgs.
Foletti, Sandra, et al., "Universal quantum control in two-electron spin quantum bits using dynamic nuclear polarization", Nature Phys. 5, 903-908 (2009), (2009), 903-908.
Green, Todd J., et al., "Arbitrary quantum control of qubits in the presence of universal noise", Preprint at (http://arxiv.org/abs/1211.1163>(2013), (2013), 30 pgs.
Green, Todd, et al., "High-order noise filtering in nontrivial quantum logic gates", Phys. Rev. Lett. 109, 020501/1-4 (2012), (2012), 5 pgs.
Hayes, David, et al., "Reducing sequencing complexity in dynamical quantum error suppression by Walsh modulation", Physical Review A 84, 062323/1-13 (2011), (2011), 1-13.
Hodgson, Thomas E., et al., "Towards optimized suppression of dephasing in systems subject to pulse timing constraints", Phys. Rev. A 81, 062321/1-16 (2010), (2010), 1-16.
Khodjasteh, K., et al., "Fault-Tolerant Quantum Dynamical Decoupling", Phys. Rev. Lett. 95, 180501/1-4 (2005), (2005), 5 pgs.

Khodjasteh, Kaveh, et al., "Arbitrarily Accurate Dynamical Control in Open Quantum Systems", Phys. Rev. Lett. 104, 090501/1-4 (Mar. 2010), (Mar. 2010), 1-4.
Khodjasteh, Kaveh, et al., "Automated Synthesis of Dynamically Corrected Quantum Gates", Phys. Rev. A 86, 042329/1-7 (2012), (2012), 1-7.
Khodjasteh, Kaveh, et al., "Designing a practical high-fidelity long-time quantum memory", Nature Communications 4, Article No. 2045, Jun. 19, 2013, (2013), 10 pgs.
Khodjasteh, Kaveh, et al., "Dynamically Error-Corrected Gates for Universal Quantum Computation", Phys. Rev. Lett. 102, 080501/1-4 (Feb. 2009), (Feb. 2009), 1-4.
Khodjasteh, Kaveh, et al., "Limits on Preserving Quantum Coherence using Multi-Pulse Control", Phys. Rev. A 83, 020305/1-4 (2011), (2011), 6 pgs.
Kofman, A. G., et al., "Universal dynamical control of quantum mechanical decay: Modulation of the coupling to the continuum", Phys. Rev. Lett. 87, 270405/1-4 (2001), (2001), 1-4.
Lee, K. W., et al., "Coherent Error Suppression in Multi-Qubit Entangling Gates", Phys. Rev. Lett. 109, 020503/1-4 (2012), (2012), 6 pgs.
Medford, J., et al., "Scaling of Dynamical Decoupling for Spin Qubits", Phys. Rev. Lett. 108, 086802/1-4 (2012), (2012), 1-4.
Merrill, J. True, et al., "Progress in compensating pulse sequences for quantum computation", Preprint at (http://arxiv.org/abs/1203.6392) (2013), (2013), 53 pgs.
Naydenov, Boris, et al., "Dynamical Decoupling of a single electron spin at room temperature", Phys. Rev. B 83, 081201(R)/1-4 (2011), (2011), 1-4.
Palma, G. Massimo, et al., "Quantum Computers and Dissipation", Proc. R. Soc. London A 452, 567-584 (1996), (1996), 567-584.
Peng, Xinhua, et al., "High fidelity quantum memory via dynamical decoupling: theory and experiment", J. Phys. B: At. Mol. Opt. Phys. 44 (2011) 154003 (6pp), (2011), 7 pgs.
Rutman, Jacques, "Characterization of Phase and Frequency Instabilities in Precision Frequency Sources: Fifteen Years of Progress", Proc. IEEE 66, 1048-1075 (1978), (1978), 1048-1075.
Ryan, C. A., et al., "Robust Decoupling Techniques to Extend Quantum Coherence in Diamond", Phys. Rev. Lett. 105, 200402/1-4 (2010), (2010), 1-4.
Sagi, Yoav, et al., "Process tomography of dynamical decoupling in a dense optically trapped atomic ensemble", Phys. Rev. Lett. 105, 053201/1-4 (2010), (2010), 1-4.
Santos, Lea F., et al., "Enhanced Convergence and Robust Performance of Randomized Dynamical Decoupling", Phys. Rev. Lett. 97, 150501/1-4 (2006), (2006), 1-4.
Shulman, M. D., et al., "Demonstration of Entanglement of Electrostatically Coupled Singlet-Triplet Qubits", Science 336, 202-205 (2011), (2011), 202-205.
Souza, Alexandre M., et al., "Robust dynamical decoupling for quantum computing and quantum memory", Phys. Rev. Lett. 106, 240501/1-4 (2011), (2011), 1-4.
Tyryshkin, A. M., et al., "Dynamical Decoupling in the Presence of Realistic Pulse Errors", Preprint at (http://arxiv.org/abs/1011.1903>(2010), (2010), 15 pgs.
Uhrig, Gotz S., et al., "Keeping a Quantum Bit Alive by Optimized p-Pulse Sequences", Phys. Rev. Lett. 98, 100504/1-4 (2007), (2007), 1-4.
Uhrig, Gotz S., et al., "Rigorous Bounds for Optimal Dynamical Decoupling", Phys. Rev. A 82, 012301 (2010), (2010), 11 pgs.
Uys, Hermann, et al., "Optimized Noise Filtration through Dynamical Decoupling", Phys. Rev. Lett. 103, 040501/1-4 (2009), (2009), 1-4.
Viola, Lorenza, et al., "Dynamical Decoupling of Open Quantum Systems", Phys. Rev. Lett. 82, 2417-2421 (1999), (1999), 2417-2421.
Viola, Lorenza, et al., "Dynamical suppression of decoherence in two-state quantum systems", Phys. Rev. A 58, 2733-2744 (1998), (1998), 2733-2744.
Viola, Lorenza, "Random decoupling schemes for quantum dynamical control and error suppression", Phys. Rev. Lett. 94, 060502/1-4 (2005), (2005), 9 pgs.

(56) References Cited

OTHER PUBLICATIONS

Wang, Zhi-Hui, et al., "Comparison of dynamical decoupling protocols for a nitrogen-vacancy center in diamond", Phys. Rev. B 85, 155204/1-15 (2012), (2012), 1-15.

Wang, Zhi-Hui, et al., "Effect of pulse error accumulation on dynamical decoupling of the electron spins of phosphorus donors in silicon", Phys. Rev. B 85, 085206/1-12 (2012), (2012), 1-12.

Yuge, Tatsuro, et al., "Measurement of the noise spectrum using a multiple-pulse sequence", Phys. Rev. Lett. 107, 170504/1-4 (2011), (2011), 8 pgs.

* cited by examiner

LONG-TIME LOW-LATENCY QUANTUM MEMORY BY DYNAMICAL DECOUPLING

CROSS-REFERENCE TO RELATED APPLICATIONS

This application is a U.S. national stage application filed under 35 U.S.C. § 371 from International Application Serial No. PCT/AU2013/000649, which was filed Jun. 18, 2013, and published as WO 2013/188910 on Dec. 27, 2013, and which claims priority to Australian Provisional Patent Application No 2012902541 filed on 18 Jun. 2012, which applications and publication are incorporated by reference as if reproduced herein and made a part hereof in their entirety, and the benefit of priority of each of which is claimed herein.

TECHNICAL FIELD

This disclosure relates to preserving a quantum state in a quantum memory. In particular, but not limited to, this disclosure relates to a method, software, a computer system and a dynamical decoupling sequence for preserving a quantum state in a quantum memory and a method for storing data in a quantum memory and a quantum memory.

BACKGROUND ART

While conventional computers store data as bits on memories, such as RAM, quantum computers store the data as qubits, that is, quantum states in a two-state quantum-mechanical system. A variety of quantum-mechanical systems may be used, such as the polarisation of a single photon, electron spin and others.

A common problem with quantum-mechanical systems is that the quantum system inevitably interacts with the environment in an uncontrolled fashion. Any fluctuations in the environment can be seen as noise that causes the quantum state to deteriorate. This is also referred to as decoherence. In order to build quantum technology, such as a quantum computer, it is necessary to store qubits similar to registers in conventional processors. However, the native coherence time of the quantum state (useful lifetime of the quantum state) is too short for most practical applications, which means that the quantum state is not recoverable in a useful form when it is needed for the next step in the computation process. Even small accumulation of error probability may render a quantum state useless for a specific purpose.

There is a need for technology that preserves the quantum state such that it is accessible for quantum information systems. This would be required, for instance, in a quantum repeater, or in a quantum computer where some quantum information must be maintained with error rates deep below fault-tolerant thresholds while large blocks of an algorithm are carried out on other qubits.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

In a first aspect there is provided a method for preserving a quantum state of a quantum system in a quantum memory, the method comprising:
  determining based on a characteristic of noise that causes deterioration of the quantum state a dynamical decoupling base sequence
    such that the duration of the base sequence is shorter than or equal to an access latency time of the quantum memory to allow access to the quantum state within the access latency time, and
    such that the deterioration of the quantum state is bounded to an upper deterioration limit when the base sequence is repeatedly applied to the quantum system.

It is an advantage that the method achieves both conflicting objectives of dynamical decoupling: short access times and long term storage with low error rates. This advantage is achieved by determining a base sequence that is shorter than the access time and that also guarantees that the deterioration of the quantum state is upper bounded. This means that this base sequence can be repeatedly applied to the quantum system which will first yield an increasing deterioration but that deterioration will eventually reach the upper limit. As a result, when the quantum state is stored for a long time, the deterioration, and therefore the error rates, will not exceed that upper limit and it is therefore guaranteed that the quantum state is stable.

It is a further advantage that a base sequence is determined that can be repeatedly applied to the quantum system. Such a base sequence is shorter than the total storage time, Ts. As a result, the number of potential base sequences is smaller. This limits the search space to shorter base sequences that are repeated up to storage time Ts, rather than selecting from the exponentially larger set of sequences with duration Ts. A limited search space allows determination of the base sequence with a reduced computational complexity compared to a larger search space.

It is an even further advantage that the method is not dependent on a particular quantum state but limits the deterioration of any quantum state. As a result, the method can be used for long term storage of arbitrary quantum states.

The method may further comprise repeatedly applying the base sequence to the quantum system.

Determining the base sequence may be based on a filter function of the base sequence, the filter function of the base sequence characterising the filtering of the noise by the base sequence.

It is an advantage that computing the filter function of the base sequence is less complex than simulating the evolution of the quantum state in the time domain under influence of the noise and base sequence. As a result, a validation of many base sequences to determine a suitable base sequence can be performed faster or using less resources.

The base sequence may comprise multiple pulses and the filter function of the base sequence may be based on time values of the multiple pulses.

It is an advantage that the filter function is based on the time values of the pulses. Since different base sequences mainly differ in the timing of the pulses, these base sequences can be characterised efficiently by their respective filter functions. Further, real-world effects, such as timing jitter, can be considered in the filter function when determining the base sequence.

Determining the base sequence may be based on an order of error suppression of the filter function of the base sequence.

It is an advantage that the order of error suppression is a single number, which makes the determination of the base sequence more efficient.

Determining the base sequence may comprise selecting one of multiple base sequences such that the order of error suppression of the filter function of the selected base sequence is above a first minimum value that is based on the noise data.

The noise data may comprise a dominant exponent s in the noise power spectrum and the order of error suppression $\alpha_P$ of the filter function of the base sequence may satisfy the constraint $s+2\alpha_P>1$.

The base sequence may comprise multiple instances of a pulse and the filter function of the base sequence may be based on a filter function of the pulse, the filter function of the pulse characterising the influence of the pulse on the filtering of the noise.

It is an advantage that determining the base sequence is based on the filter function of the pulse. As a result, realistic imperfections, such as non-ideal pulse shapes, can be considered which is important for designing a real-world quantum memory.

Determining the base sequence may be based on an order of error suppression of the filter function of the pulse.

Determining the base sequence may comprise selecting one of multiple base sequences such that the order of error suppression of the pulse of the selected base sequence is above a second minimum value that is based on the noise data.

The noise data may comprises a dominant exponent s in the noise power spectrum and the order of error suppression $\alpha_{Pul}$ of the filter function of the pulse may satisfy the constraint $s+2\alpha_{Pul}>1$.

The noise data may comprise a cut-off frequency of the noise and the duration of the base sequence may be based on the cut-off frequency of the noise.

It is an advantage that the cut-off frequency is a single number and therefore, determining the base sequence with a particular duration in relation to the cut-off frequency is simplified.

Determining the base sequence may comprise selecting one of multiple base sequences such that the duration of the selected base sequence is below a second maximum value that is based on the cut-off frequency of the noise.

The advantage is similar to the above advantage of reducing the number of available base sequences for selection.

The duration $T_p$ of the base sequence may satisfy the constraint $T_p\omega_c<2\pi$, with $\omega_c$ being the cut-off frequency of the noise.

The base sequence may be based on one or more Walsh functions.

In a second aspect there is provided software that when installed on a computer causes the computer to perform the method of the first aspect.

In a third aspect there is provided a computer system for preserving a quantum state in a quantum memory having an access latency time, the computer system comprising:
  a timing module to generate timing data defining multiple instances of a base timing sequence, the duration of the base timing sequence being shorter than or equal to the access latency time to allow access to the quantum state within the access latency time and having a configuration such that the deterioration of the quantum state caused by noise is bounded to an upper deterioration bound when a sequence of stimulation pulses according to the base timing sequence is repeatedly applied to the quantum system; and
  an output port to send the timing sequence to a pulse generator to trigger the application of the stimulation pulses to the quantum system.

In a fourth aspect there is provided a dynamical decoupling sequence for preserving a quantum state in a quantum system of a quantum memory having an access latency time, the sequence comprising:
  multiple instances of a base sequence, the duration of the base sequence being shorter than or equal to the access latency time to allow access to the quantum state within the access latency time and having a configuration such that the deterioration of the quantum state is bounded to an upper deterioration limit when the base sequence is repeatedly applied to the quantum system.

In a fifth aspect there is provided a method for storing data in a quantum system of a quantum memory accessible within an access latency time, the method comprising:
  receiving the data to be stored in the quantum memory;
  creating a quantum state in the quantum memory to represent the data; and
  applying a sequence of stimulation pulses to the quantum system to preserve the quantum state, wherein the sequence of stimulation pulses comprises multiple instances of a base sequence, the duration of the base sequence being shorter than or equal to the access latency time to allow access to the quantum state within the access latency time and having a configuration such that the deterioration of the quantum state is bounded to an upper deterioration limit when the base sequence is repeatedly applied to the quantum system.

In a sixth aspect there is provided a quantum memory for storing data accessible within an access latency time, the quantum memory comprising:
  an input port to receive the data to be stored in the quantum memory;
  a controller to create a quantum state of a quantum system in the quantum memory to represent the data; and
  a generator to apply a sequence of stimulation pulses to the quantum system to preserve the quantum state, wherein the sequence of stimulation pulses comprises multiple instances of a base sequence, the duration of the base sequence being shorter than or equal to the access latency time to allow access to the quantum state within the access latency time and having a configuration such that the deterioration of the quantum state is bounded to an upper deterioration limit when the base sequence is repeatedly applied to the quantum system.

Optional features described of any aspect, where appropriate, similarly apply to the other aspects also described here.

BRIEF DESCRIPTION OF DRAWINGS

An example will be described with reference to
FIG. 1 illustrates a quantum memory.

DETAILED DESCRIPTION

Figure 1:
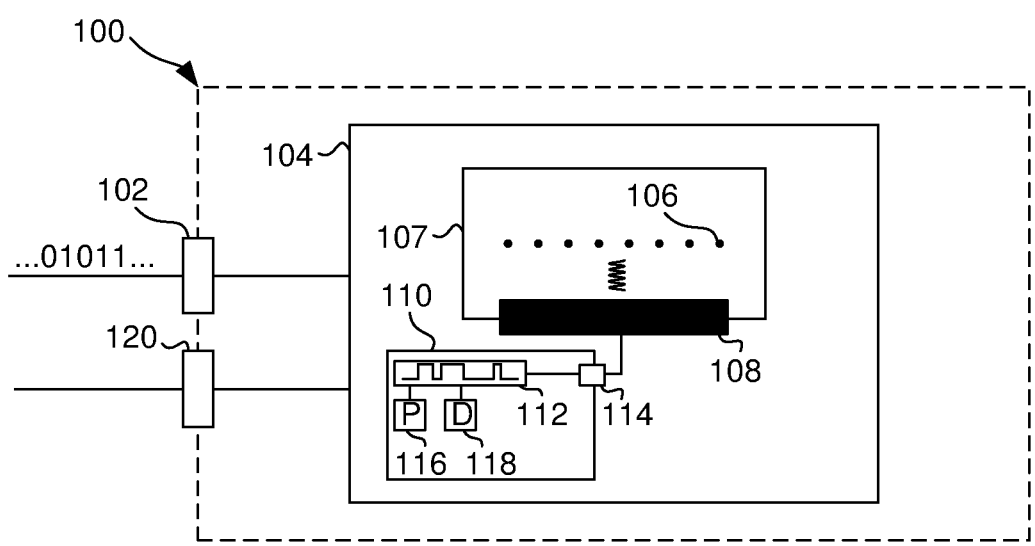

FIG. 1 illustrates a quantum memory 100 comprising a data port 102 through which quantum states are written. The data port 102 is connected to a controller 104. In one example, the controller 104 receives binary data through the data port 102 and determines quantum states that represent the binary data. In a different example, the controller 104 receives quantum states through the data port 102, such as a series of 'up' or 'down' values. The data port 102 receives input data to be stored in the quantum memory 100 as well as sends output data that is retrieved from the quantum memory 100.

The controller 104 controls a quantum system 106, such as an electron spin by using a generator 108. Although FIG. 1 shows multiple quantum systems 107, the following description only refers to the single quantum system 106 for sake of simplicity. Of course, multiple quantum systems are also applicable and the respective quantum states may be entangled.

In this example, the generator is connected to a computer system 110, such as a sequencer, comprising a timing module in form of a processor 112, an output port 114, program memory 116 and data memory 118. The quantum memory 100 further comprises a control port 120, which is a classical binary port taking information about what memory address to write or read to, what pulse sequence to apply, etc. Of course, data port 102 and control port 120 may be multiplexed and have multiple bit lines, such as 32 bit, or may be serialised.

Although the computer system 110 is shown to be integrated into the quantum memory 100, it is to be understood that the computer system 110 may equally be located outside the quantum memory and provide timing data to the controller 104 through control port 120.

When in use, the quantum memory 100 stores data such that the data is accessible within an access latency time. This means that the quantum memory receives at the control port 120 a data request including a memory address and sends the requested data via the data port 120 within the access latency time, that is, the time between receiving the request and sending the data is shorter than the access latency time.

The access latency time may be a design parameter of the quantum memory 100 and may be dependent on the environment of the quantum memory 100. For example, if the quantum memory is connected to a conventional digital computer, the latency time may be the memory access cycle time of the conventional digital computer, such that the data access is synchronised with the rest of the computations. In other examples, the quantum memory 100 is integrated into a quantum computer and the access latency is defined by the quantum computing environment.

The quantum memory 100 receives data to be stored in the quantum memory 100 via data port 102 and the controller creates a quantum state of the quantum system 106 to represent the data. For example, the quantum memory 100 receives a binary '1' and creates an 'up' spin of the electron that serves as the quantum state 106.

From the moment the quantum state is created, that is, written to the memory hardware, the quantum state deteriorates as a result of the interaction of the quantum state with the environment which may exhibit uncontrolled fluctuations called noise. The result of this noise coupling to the quantum system is deterioration of the quantum state, known as decoherence. In order to counteract this deterioration, generator 108 applies a sequence of stimulation pulses to the quantum system 106. These stimulation pulses repeatedly modulate the quantum state and therefore, reduce the influence of the noise to the quantum state and preserves the quantum state, which is referred to as dynamical decoupling.

The timing of the stimulation pulses is important for the preservation of the quantum state and defined by a so called sequence. It is noted here that the drive field may be "always on" but it is amplitude or frequency modulated according to the sequence. Many different sequences are theoretically possible but only those sequences that reduce the deterioration of the quantum state are useful. In particular, a certain deterioration of the quantum state may be permitted such that the state transferred out of the memory and into another system is below a predefined error rate. In some examples, quantum error correction, incorporating analogues of the classical phenomenon of redundancy, can be implemented to guarantee correct data given a maximum error rate.

An inherent limitation of dynamical decoupling is that interrupting a sequence before it has been completely applied to the quantum state causes significant performance losses. As a result, the duration of the sequence has to be identical to the required storage time. However, in most applications, the required storage time is not known since it depends on the data that needs to be processed and the ultimate application (e.g. quantum computation or quantum repeaters). For example, when performing a quantum computation aimed at, e.g. implementing Shor's factoring algorithm, some inputs may compute faster than others and the required storage time for memory in the process varies significantly. Setting the duration of the sequence to the maximally expected storage time is not practical in most applications. This exemplifies the need for a technology that allows long storage times but also short access latency times.

To address this need, a dynamical decoupling sequence is created that comprises multiple instances of a base sequence. The duration of the base sequence is shorter or equal to the access latency time. The worst case scenario occurs when data is requested shortly after the base sequence has commenced. In this scenario the entire base sequence needs to complete before the data can be returned. By making the duration of the base sequence shorter or equal to the access latency time, access to the quantum state within the access latency time is allowed.

Further, the base sequence has a specific configuration, such as timing of the pulses of the base sequence. This configuration is such that when the generator 108 repeatedly applies the stimulation pulses to the quantum system 106, the deterioration of the quantum state is bounded to an upper deterioration bound. This means that the deterioration does not exceed the upper deterioration bound even when the same base sequence is applied for many more times, so long as the quantum state in the memory is only accessed after an integer number of base-sequence applications.

In other words, if the stored data is accessed during the application of the base sequence, the error rate will be well above most error limits. Therefore, throughout this specification, the term 'deterioration of the quantum state' refers to the quantum state at the end of a repetition of the base sequence and not during the base sequence. In this sense the quantum state is not recoverable while the base sequence is applied because the quantum system is walked through a series of intermediary states that are not 'the quantum state' which represents the stored data.

In the example of FIG. 1 the generation of timing data is performed by processor 112 while the generation and application of the pulses is performed separately by generator 108. The timing data defines the multiple instances of the base sequence and may be a digital trigger signal, such as rising edge, a set of time values or an expression describing the sequence (eg. 5*3 ns, 2*1 ns). The computer system 110 executes software, such as firmware of the quantum memory, stored on program memory 116 to perform the method of FIG. 2 for preserving the quantum state of the quantum system 106 in the quantum memory 100.

Figure 2:
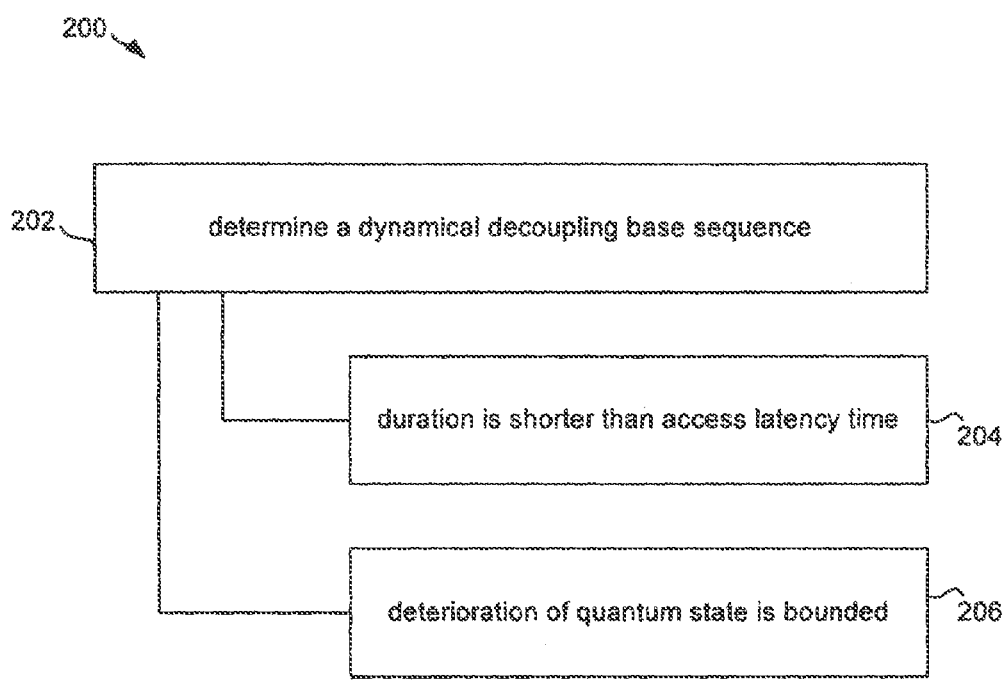
FIG. 2 illustrates a method for preserving a quantum state of a quantum system in a quantum memory.

FIG. 2 illustrates a method 200 for preserving a quantum state of a quantum system in a quantum memory as performed by processor 112. The processor 112 determines 202 based on a characteristic of noise that causes deterioration of the quantum state the dynamical decoupling base sequence. The processor 112 determines the base sequence such that 204 the duration of the base sequence is shorter than or equal to an access latency time of the quantum memory. As mentioned earlier, this allows access to the quantum state within the access latency time. A second condition 206 of the determination of the base sequence is that the deterioration of the quantum state is bounded to an upper deterioration limit when the base sequence is repeatedly applied to the quantum system.

The following description is a more detailed explanation of the above method.

The salient features of the approach may be appreciated by first focusing on a single qubit subject to dephasing. In the absence of control, we consider a model Hamiltonian of the form $H \equiv \sigma_z \otimes (\varepsilon_0 + B_z) + H_E$, where the Pauli matrix $\sigma_z$ and $\varepsilon_0$ define the qubit quantization axis and internal energy, respectively (we can set $\varepsilon_0 = 0$ henceforth), and $B_z$, $H_E$ are operators acting on the environment Hilbert space.

An exact analysis of both the free and the controlled dynamics is possible if the environment can be described in terms of either a quantum bosonic bath in thermal equilibrium (spin-boson model), a weakly-coupled quantum spin bath (spin-bath model), or a stationary Gaussian stochastic process (classical-noise model) [1, 4, 25-31].

Such dephasing models provide an accurate physical description whenever relaxation processes associated with energy exchange occur over a characteristic time scale ($T_1$) substantially longer than any typical time scale associated with the dephasing dynamics. As a result, our analysis is directly relevant to a wide range of experimentally relevant qubit systems, from trapped ions and atomic ensembles [8, 10] to spin qubits in nuclear and electron magnetic resonance and quantum dots [12-14, 17, 31, 32].

Processor 110 considers the effects of dynamical decoupling (DD) within a filter-design framework which generalizes a transfer-function approach and provides a transparent and experimentally relevant picture of the controlled dynamics in the frequency domain [8, 9, 24, 26, 34, 35].

In order to more easily introduce key concepts and clearly reveal our underlying strategy, we first consider an idealized "bang-bang" DD setting in which perfect instantaneous π rotations are effected by using unbounded control amplitudes. As we move forward, we will relax these constraints, and demonstrate how similar results may be obtained with experimentally realistic controls.

'Realistic' in this disclosure does not mean that options that are not 'realistic' are not possible or not applicable. However, a 'realistic' scenario is a scenario that takes into account imperfections that have been neglected in an idealised scenario.

Figure 3:
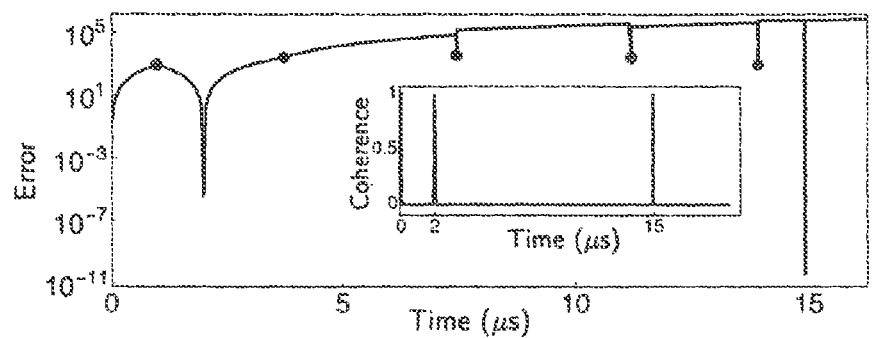
FIG. 3 illustrates experimental data of access-latency in high-order dynamical decoupling sequences.

FIG. 3 illustrates experimental data of access-latency in high-order DD sequences. DD error and coherence (inset) during a $UDD_5$, that is Uhrig DD, sequence with minimum interpulse time $\tau = 1$ ps. Pulse times are marked with filled circles while the open circle indicates the readout time $T_p$. Minimal error (maximal coherence) is reached only at the conclusion of the sequence, with the coherence spike near 2 μs resulting from a spin-echo effect. For illustration purpose, in all figures we assume a phenomenological noise model appropriate for nuclear-spin induced decoherence in a spin qubit in GaAs, $S(\omega) = g(\omega/\omega_c)^{-2} e^{-\omega^2/\omega_c^2}$, with $\omega \in [\omega_{min}, \omega_{max}]$. We set $g = 0.207 \omega_c$, $\omega_c/2\pi = 10$ kHz, $\omega_{min}/2\pi = 0.01$ Hz, and $\omega_{max}/2\pi = 10^8$ Hz to maximize agreement with the measured $T_2$ (35 ns) [13, 36]. We chose $\tau$ well above technological constraints (~ns) in order to reduce n.

In such an idealized control scenario, a DD sequence may be specified by timing data as generated by processor 110 in terms of the pulse-timing pattern $p = \{t_j\}_{j=1}^n$, where we also define $t_0 \equiv 0$, $t_{n+1} \equiv T_p$ as the sequence duration, and we take all the interpulse intervals $(t_{j+1} - t_j)$ to be lower-bounded by a minimum interval $\tau$ [28].

The control propagator reads $U_c(t) = \sigma_x^{[y_p(t)+1]/2}$, with $y_p(t)$ being a piecewise-constant function that switches between ±1 whenever a pulse is applied. The effect of DD on qubit dephasing may be evaluated exactly in terms of a spectral overlap of the control modulation and the noise power spectral density, $S(\omega)$ [26, 34], which is determined by the Fourier transform of the two-time noise correlation function [30].

Typically, $S(\omega)$ has a power-law behavior at low frequencies, and decays to zero beyond an upper cutoff frequency $\omega_c$, that is, $S(\omega) \propto \cos \omega^s f(\omega, \omega_c)$, and the "rolloff function" $f$ specifies the high-frequency behavior, $f = \Sigma(\omega - \omega_c)$ corresponding to a "hard" cutoff. Let $\tilde{y}_p(\omega)$ denote the Fourier transform of $y_p(t)$, which is given by $\tilde{y}_p(\omega) = \omega^{-1} \Sigma_{j=0}^n (-1)^j [\exp(it_j\omega) \exp(it_{j+1}\omega)]$ [4, 26].

The filter function (FF) of the sequence p is given by $F_p(\omega) = \omega^2 |\tilde{y}_p(\omega)|^2$, and the bang-bang-controlled qubit coherence decays as $e^{-\chi_p}$, where the decoupling error $$\chi_p = \int_0^\infty \frac{S(\omega)}{2\pi\omega^2} F_p(\omega) d\omega \text{ at time } t = T_p,$$

and the case n=0 recovers free evolution over [0, $T_p$].

In this framework, the applied DD sequence behaves like a "high-pass" filter, suppressing errors arising from slowly fluctuating (low-frequency) noise. Appropriate construction of the sequence then permits the bulk of the noise power spectrum to be efficiently suppressed, and coherence preserved.

For a given sequence p, this effect is captured quantitatively through the order of error suppression $\alpha_p$, determined by the scaling of the FF near $\omega = 0$, that is, $F_p(\omega) \equiv |A_{bb}|^2 \omega^{2(\alpha_p+1)} \propto (\omega\tau)^{2(\alpha_p+1)}$, for a sequence-dependent pre-factor $A_{bb}$. A high multiplicity of the zero at $\omega = 0$ leads to a perturbatively small value of $\chi_p$ as long as $\omega_c \sigma \ll 1$. In principle, processor 110 may thus achieve low error probabilities over a desired storage time $T_s$ by using a high-order DD sequence, such as Concatenated DD (CDD, [3]) or Uhrig DD (UDD, [4]), with the desired storage time $T_s \equiv T_p$.

Quantum memory requirements.

Once we attempt to move beyond this idealized scenario in order to meet the needs of a practically useful, long-time quantum memory, several linked issues arise.

First, perturbative DD sequences may be difficult to use for high-fidelity long-time storage as they require arbitrarily fast control ($\tau \to 0$). Many systems face systematic constraints mandating $\tau > 0$, and as a result, increasing $\alpha_p$ necessitates extension of $T_p$, placing an upper bound on high-fidelity storage times [27, 28, 37]. (For instance, a UDD sequence achieves $\alpha_p = n$ with n pulses, applied at $t_j = T_p \sin^2[\pi j/(2n+2)]$. For fixed $T_p$, increasing $\alpha_p$ implies increasing n, at the expenses of shrinking $\tau$ as $\tau \equiv t_1 = O(T_p/n^2)$. If $\tau > 0$ is fixed, and $\alpha_p$ is increased by lengthening $T_p$, eventually the perturbative corrections catch up, preventing further error reduction.)

Second, potentially useful numerical DD approaches, such as randomized DD [38, 39] or optimized "bandwidth-adapted" DD [28], become impractical as the configuration space of all possible DD sequences over which to search grows exponentially with $T_s$.

Third, DD exploits interference pathways between control-modulated trajectories, meaning that mid-sequence interruption ($t < T_p$) typically result in significantly sub-optimal performance (FIG. 3). However, a stored quantum state in a practical quantum memory must be accessible not just at a designated final retrieval time but at intermediate times also, at which it may serve as an input to a quantum protocol.

Addressing all such issues requires a systematic approach to DD sequence construction. Here, we identify a "modular" approach to generate low-error, low-latency DD sequences for long-time storage out of shorter blocks: periodic repetition of a base, high-order DD cycle, that is, the base sequence.

Quantum memory via periodic repetition.

The effect of repetition for an arbitrary sequence is revealed by considering the transformation properties of the FF under sequence combination. Consider two sequences, $p_1$ and $p_2$, joined to form a longer one, denoted $p_1 + p_2$, with propagator $y_{p_1+p_2}(t)$. In the Fourier space we have $$\tilde{y}_{p_1+p_2}(\omega) = \tilde{y}_{p_1}(\omega) + e^{i\omega T_{p_1}} \tilde{y}_{p_2}(\omega).$$

Let now $[p]^m$ denote the sequence resulting from repeating p, of duration $T_p$, m times, with $T_s = mT_p$. Computing $\tilde{y}_{[p]^m}(\omega)$ by iteration, the following exact expression is found:

$$\chi_{[p]^m} = \int_0^\infty \frac{S(\omega)\sin^2(m\omega T_p/2)}{2\pi\omega^2 \sin^2(\omega T_p/2)} F_p(\omega) d\omega. \quad (1)$$

Equation (1) describes dephasing dynamics under arbitrary multipulse control, generalizing special cases in which this strategy is implicitly used for simple base sequences (periodic DD, p={$\sigma, \sigma$} [27] and Carr-Purcell, p={$\tau, 2\tau, \tau$}), and showing similarities with the intensity pattern due to an m-line diffraction grating [31].

The single-cycle FF, $F_p(\omega)$, is multiplied by a factor which is rapidly oscillating for large m and develops peaks scaling with $O(m^2)$ at multiples of the "resonance frequency," $\omega_{res} = 2\pi/T_p$, introduced by the periodic modulation (see FIG. 1 for an illustration).

After many repeats, the DD error is determined by the interplay between the order of error suppression of the base sequence, the noise power behavior at low frequencies, and the size of noise contributions at the resonance frequencies; The case of a hard upper frequency cutoff at $\omega_c$ is the simplest to analyze.

Applying the Riemann-Lebesgue lemma removes the oscillating factor, resulting in the following asymptotic expression:

$$\lim_{m \to \infty} \chi_{[p]^m} \equiv \chi_{[p]^\infty} = \int_0^{\omega_c} \frac{S(\omega)}{4\pi\omega^2} \frac{F_p(\omega)}{\sin^2(\omega T_p/2)} d\omega, \quad (2)$$

provided that $\chi_{[p]^\infty}$ is finite. The meaning of this exact result is remarkable: for small m, the DD error initially increases as $(m^2 \chi_p)$, until coherence stroboscopically saturates to a non-zero residual plateau value ($e^{-\chi_{[p]^\infty}}$), that is, an upper deterioration limit, and no further decoherence occurs.

Mathematically, the emergence of this coherence plateau requires that simple conditions be obeyed by the chosen base sequence relative to the characteristics of the noise:

$$s + 2\alpha_p > 1, T_p \omega_c < 2\pi, \quad (3)$$

which correspond to removing the singularity of the integrand in Eq. (2) at 0 and $\omega_{res}$, respectively. Thus, judicious selection of a base sequence, fixing $\alpha_p$ and $T_p$, can guarantee indefinite saturation of coherence in principle.

Moreover, since $\chi_{[p]^m} \leq 2\chi_{[p]^\infty}$ for all m, the emergence of coherence saturation in the infinite-time limit stroboscopically guarantees high fidelity throughout long storage times. By construction, this approach also guarantees that access latency is capped at the duration of the base sequence, with $t_j = T_p \ll T_s$; sequence interrupts at intermediate times that are multiples of $T_p$ are thus permitted in the plateau regime without degradation of error suppression.

Figure 4:
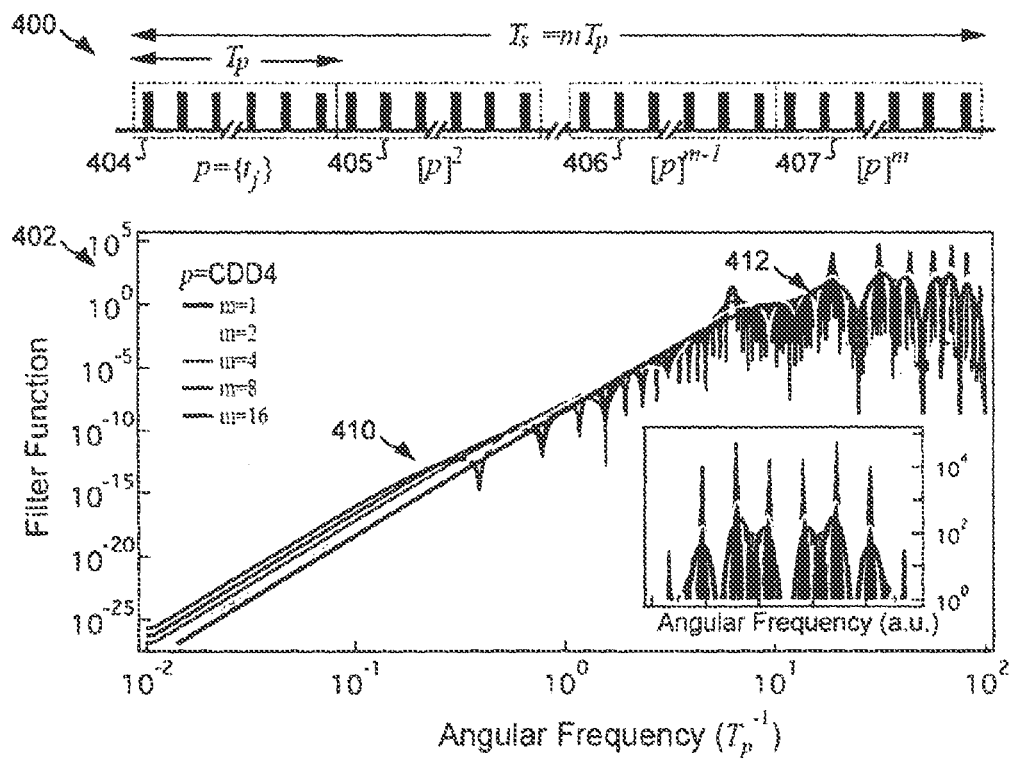
FIG. 4 illustrates a schematic representation of base sequence repetition and the effect on the filter function.

FIG. 4 illustrates a schematic representation of base sequence repetition 400 and the effect on the filter function 402. Top: The base sequence p is indicated in dashed boxes 404-407, and repeated m times up to a total storage time $T_s$. Bottom: FF 402 for repetition of a $CDD_4$ cycle. The FF on a log-log plot grows 410 with frequency with slope set by $\alpha_p$ until it reaches the passband 412, where noise is passed largely unimpeded (thick line). Noise dominated by spectral components in this region is efficiently suppressed by DD. As m grows, the sinusoidal terms in Eq. (1) lead to the emergence of "resonance" frequencies that modify the single-cycle FF and produce sharp peaks in the passband. These must be considered when accounting for the effects of noise at long storage time due to "resonance" effects. Inset: FF passband on a log-linear plot.

Additional insight in the above phenomenon may be gained by recalling that for free dephasing dynamics ($\alpha_p = 0$), the possibility of non-zero asymptotic coherence may occur for supra-Ohmic (s > 1) bosonic environments [25, 27], consistent with Eq. (3). The onset of a plateau regime in the controlled dynamics may then be given an intuitive interpretation by generalizing the analysis carried out in [27] for periodic DD: if the conditions in Eq. (3) are obeyed, the low-frequency (long-time) behavior becomes effectively supra-ohmic by action of the applied DD sequence and, after a short-time transient, the dephasing dynamics "oscillate in phase" with the periodically repeated blocks. For sufficiently small $T_p$, the "differential" DD error accumulated over each cycle in this steady state is very small, leading to the stroboscopic plateau. Interestingly, that phase noise of a local oscillator can saturate at long times under suitable spectral conditions has also long been appreciated in the precision oscillator community [33].

Figure 5:
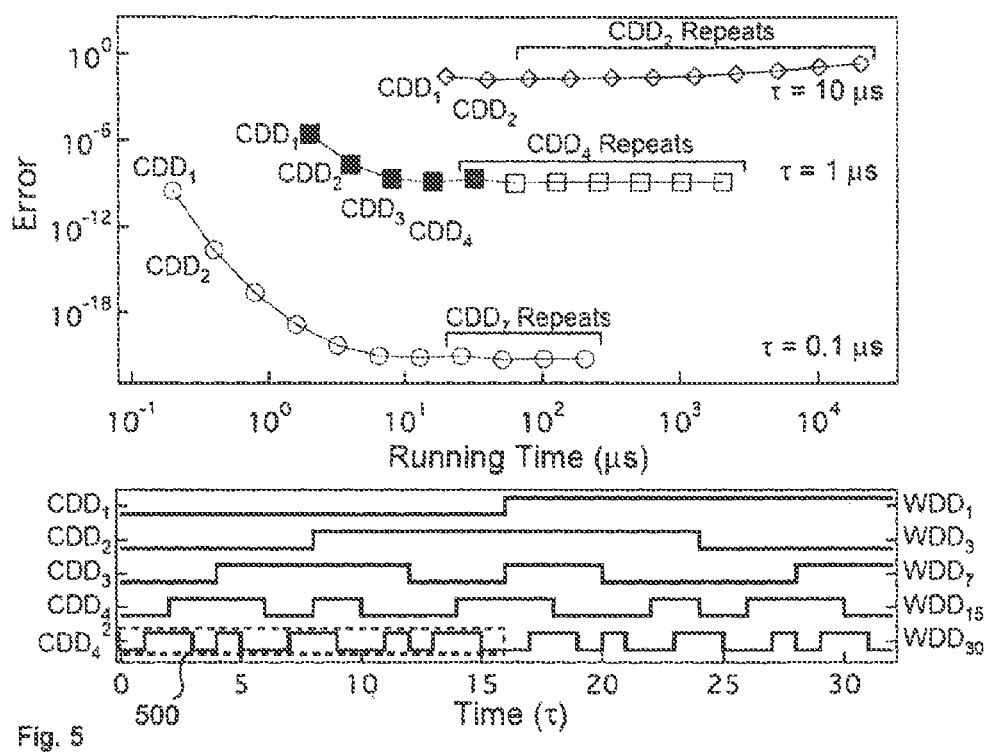
FIG. 5 illustrates the emergence of a stroboscopic coherence plateau.

FIG. 5 illustrates the emergence of a stroboscopic coherence plateau, that is an upper deterioration limit, and sequence structure, that is configuration of a base sequence. Top: Minimal-error DD sequences from numerical search over Walsh DD, for $\tau$=0.1, 1, 10 μs. In each series, the minimal-error sequences systematically access higher orders of error cancellation (via concatenation) over increasing running times, until an optimal concatenated sequence is found which is then repeated in the longer minimal-error sequences.

The gradual increase in error (loss of plateau) for the series with $\tau$=10 μs is due to the softness of the high-frequency cutoff and the constraints placed on $T_p$ by fixing $\tau$. For the case of $\tau$=1 μs, we have calculated the error out to m≈$10^8$ repeats ($T_s$≈$10^3$ s, data not shown) without an observable effect from the soft cutoff.

Bottom: Control propagators corresponding to the solid markers in the middle data series ($\tau$=1 μs), showing the emergence of a periodic structure for sufficiently long storage time. Labels indicate the corresponding sequence designations in either the CDD or Walsh basis. Control propagators scaled to same length for ease of comparison. Dashed box 500 highlights base sequence $CDD_4$ that is repeated for long times. In this example, "pi" pulses are applied to the quantum system at the times of the flanks (falling or rising) of the control propagator.

In light of the above considerations, the occurrence of a coherence plateau may be observed even for sub-Ohmic noise spectra (s<1), as typically encountered, for instance, in both spin qubits (s=−2, as in FIG. 3) and trapped ions (s=−1, [40]).

Numerical calculations of the DD error using such realistic noise spectra demonstrate both the plateau phenomenon and the approach of periodically repeated sequences as an efficient solution for long-time storage, also confirming the intuitive picture given above. In these calculations, we employ a direct bandwidth-adapted DD search up to time $T_s$, by enforcing additional sequencing constraints. Specifically, we turn to Walsh DD, wherein pulse patterns are given by the Walsh functions, to provide solutions that are efficient in the complexity of sequencing [29]. Walsh DD comprises familiar DD protocols, such as spin echo, Carr-Purcell, and CDD, along with more general protocols, including repetitions of shorter sequences.

Starting with a free evolution of duration $\tau$, all possible Walsh DD sequences can be recursively built out of simpler ones within Walsh DD, doubling in length with each step. Further, since all interpulse intervals in Walsh DD protocols are constrained to be integer multiples of $\tau$, there are $$\frac{1}{2}(T_s/\tau)$$

Walsh DD sequences that stop at time $T_s$, a very small subset of all $2^{T_s/\tau}$ possible digital sequences, enabling an otherwise intractable bandwidth-adapted DD numerical minimization of the spectral overlap integral $\chi_p$.

Representative results are shown in FIG. 4, where for each $T_s$ all Walsh DD sequences with given $\tau$ are evaluated and those with the lowest error are selected. The choice of $\tau$ sets the minimum achievable error and also determines whether a plateau is achievable, as, for a given $T_s$, it influences the available values of $T_p$ and $\alpha_p$. As $T_s$ grows, the best performing sequences (shown) are found to consist of a few concatenation steps (increasing $\alpha_p$ of the base sequence to obey Eq. (3)), followed by successive repetitions of that fixed cycle.

Once the plateau is reached, increasing the number of repetitions does not affect the calculated error, indicating that stroboscopic sequence interrupts, and therefore access to the quantum state, would be permitted without performance degradation. Beside providing a direct means of finding high-fidelity long-time DD schemes, these numerical results support our key analytic insights as to use of periodic sequence design.

Non-Ideal Effects

For clarity, we have thus far relied on a variety of simplifications, including an assumption of pure phase decoherence and perfect π rotations. However, as we next show, our results hold in much less idealized scenarios. We begin by considering non-ideal control limitations.

Of greatest importance is the inclusion of errors due to finite pulse duration, as they will grow with $T_s$ if not appropriately compensated. Even starting from the dephasing-dominated scenario we consider, applying real DD pulses with duration $\tau_\pi$/>0 introduces both dephasing and depolarization errors, the latter along, say, the y-axis if control along x is used for pulsing. As a result, the conditions given in Eq. (3) can no longer guarantee a coherence plateau in general: simply incorporating "primitive" uncorrected π-pulses into a high-order DD sequence may contribute a net depolarizing error substantial enough to make a plateau regime inaccessible.

This intuition may be formalized, and new conditions for the emergence of a coherence plateau determined, by exploiting a generalized multi-axis FF formalism [35, 41], in which both environmental and finite-width errors may be accounted for, to the leading order, by adding in quadrature the z and y components of the "control vector" that are generated in the non-ideal setting.

The end result of this procedure may be summarized in a transparent way: to the leading order, the total FF can be written as $F(\omega) \equiv F_p(\omega) + F_{pul}(\omega) \approx |A_{bb}|^2 \omega^{2(\alpha_p+1)} + |A_{pul}|^2 \omega^{2(\alpha_{pul}+1)}$, where $F_p(\omega)$ is the FF for the bang-bang DD sequence previously defined and $F_{pul}(\omega)$ depends on the details of the pulse implementation. Corrections in the pre-factors $A_{bb}$, $A_{pul}$ arise from higher-order contributions. The parameter $\alpha_{pul}$ captures the error suppression properties of the pulses themselves, similar to the sequence order of error suppression $\alpha_p$. A primitive pulse results in $\alpha_{pul}$=1 due to the dominant uncorrected y-depolarization. An expression for the asymptotic DD error may then be obtained starting from Eq. (1) and separating $\chi_{[p]}^\infty = \chi_{[p]}^{\infty,bb} + \chi_{[p]}^{\infty,pul}$. An additional constraint thus arises by requiring that both the original contribution $\chi_{[p]}^{\infty,bb}$ of Eq. (2) and $\chi_{[p]}^{\infty,pul}$ be finite. Thus, in order to maintain a coherence plateau in the long-time limit we now require $$s+2\alpha_p>1, s+2\alpha_{pul}>1, T_p\omega_c<2\pi. \quad (4)$$

Figure 6:
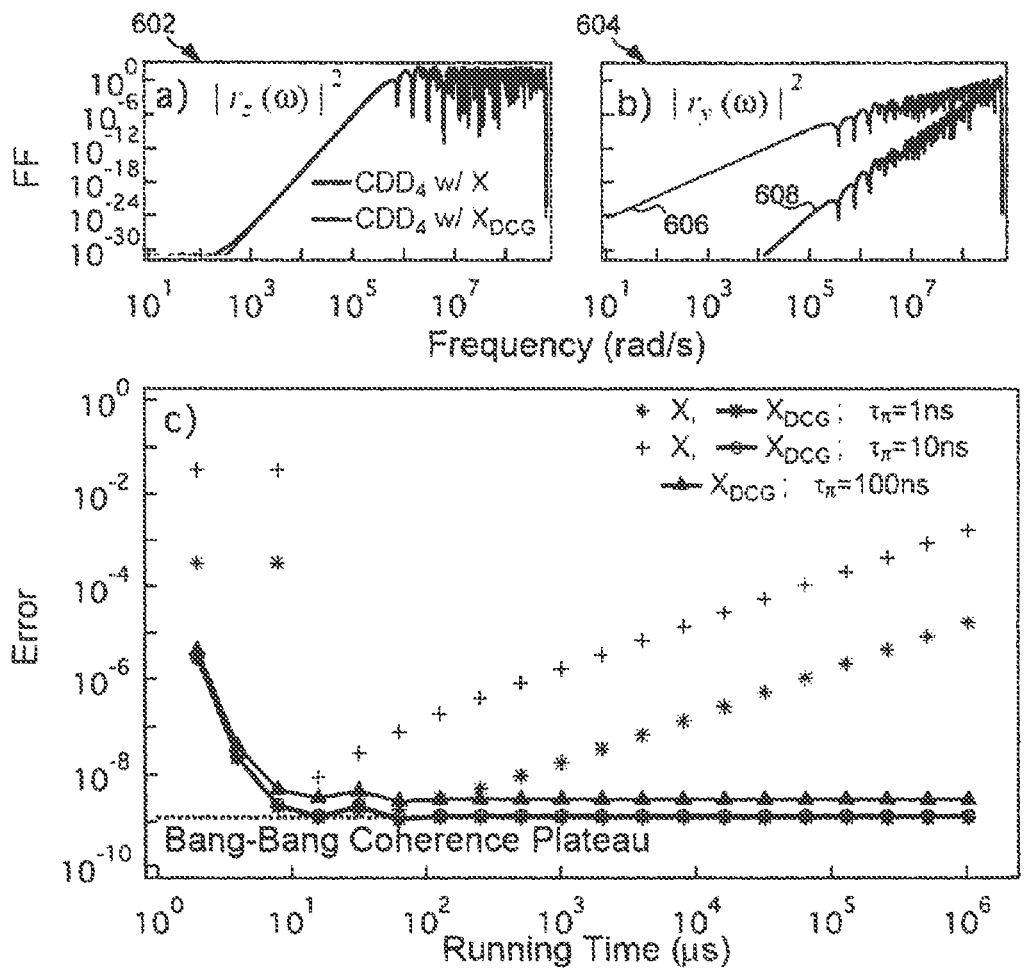
FIG. 6 illustrates realistic filter functions and effect of finite-width errors and soft cutoff.

FIG. 6 illustrates realistic filter functions and effect of finite-width errors and soft cutoff. a) z (dephasing) 602 and b) y (depolarization) quadrature components 604 of the total FF for $CDD_4$, $F(\omega)=F_p(\omega)+F_{pul}(\omega) \equiv |r_y(\omega)|^2 + |r_z(\omega)|^2$, incorporating non-zero duration uncorrected $\pi_x$ 606, and first-order dynamically corrected gates (DCGs) 608 [5, 41], $\tau_\pi$=1 ns. In the ideal case, the depolarization contribution $|r_y(\omega)|^2$=0, and $F(\omega) \equiv F_p(\omega)$. The improvement of $\alpha_{pul}$ for $CDD_4$ with DCGs is demonstrated by the increased slope of $|r_y(\omega)|^2$ in panel b). c) DD error for the $\tau$=1 μs data set of FIG. 4, using finite-duration pulses. Sub-Ohmic noise spectrum with s=−2 and soft Gaussian cutoff as in FIG. 3 are assumed. The low-value of $\alpha_{pul}$ for primitive pulses leads to unbounded error growth, terminating the plateau after a small number of repeats, determined by the ratio of $\tau_\pi/\tau$. Sequences incorporating DCGs meet the conditions for plateau out to at least 1 s storage time, with error increased by a factor of order unity compared with the bang-bang coherence plateau value, using $\tau_\pi$ up to 100 ns. Outlier data points for CDD$_3$ arise because of even-odd effects in the FF when including pulse effects.

We demonstrate the effects of pulse-width errors in FIG. 4c. When using primitive $\pi_x$-pulses ($\alpha_{pul}$=1), the depolarizing contribution due to $F_{pul}(\omega)$ dominates the total value of $\chi_{[P]}{}^m$. For the dephasing spectrum we consider, s=−2, the condition for maintenance of a plateau using primitive pulses is not met, and the total error grows unboundedly with m after a maximum plateau duration $T_{max} \equiv m_{max} T_p$ ($m_{max}$ may be estimated by requiring that $\chi_{[P]}{}^{m^{pul}} > \chi_{[P]}{}^{m^{bb}}$).

The unwanted depolarizing contribution can, however, by suppressed by appropriate choice of a higher-order "corrected" pulse, such as a DCG [5, 6], to provide efficient error suppression in the presence of non-Markovian time-dependent noise [33]. For a first-order DCG, the dominant error contribution is canceled, resulting in $\alpha_{pul}$=2, as illustrated in FIGS. 6a)-b); incorporating DCGs into the base DD sequence thus allows the coherence plateau to be restored.

For small values of $\tau_\pi$, the error contribution $\chi_{[P]}{}^{m^{pul}}$ remains small and the plateau error is very close to that obtained in the bang-bang limit. Increasing $\tau_\pi$ leads this error contribution to grow, and the plateau saturates at a new higher value.

"Hardware-adapted" DCGs additionally provide a means to ensure robustness against control imperfections (including rotation-angle and/or off-resonance errors) while incorporating realistic control constraints. For instance, sequences developed for singlet-triplet spin qubits [42] can simultaneously achieve insensitivity against nuclear-spin decoherence and charge noise in the exchange control fields, with inclusion of finite timing resolution and pulse rise times.

A quantitative performance analysis may be carried out in principle through appropriate generalization of the FF formalism introduced above. Thus, the replacement of low-order primitive pulses with higher-order corrected pulses provides a straightforward path toward meeting the conditions for a coherence plateau with realistic DD sequences. These insights are also supported by DD nuclear magnetic resonance experiments [31, 32], that have demonstrated the ability to largely eliminate the effects of pulse imperfections in long pulse trains.

Another experimentally realistic and important control imperfection is limited timing precision. The result of this form of error is either premature or delayed memory access at time $T_s = mT_p \pm \delta t$, offset relative to the intended one. Qualitatively, the performance degradation resulting from such access-timing errors may be similar to the one suffered by a high-order DD sequence under pulse-timing errors, analyzed in [24]. A rough sensitivity estimate may be obtained by adding an uncompensated "free-evolution" period of duration $\delta t$ following the mth repeat of the sequence, with the resulting FF being determined accordingly. In this case the effective order of suppression transitions $\alpha_p \to 0$, appropriate for free evolution, at a crossover frequency determined by the magnitude of the timing jitter.

In order to guarantee the desired (plateau) fidelity level, it is necessary that the total FF—including timing errors—still meets the requirements set in Eq. (4). In general, this is achievable for supra-Ohmic spectra with s>1. When these conditions are not met, the resulting error can be much larger than the plateau value if the jitter is appreciable. Access timing therefore places a constraint on a system designer to ensure that quantum memories are clocked with low-jitter, high-resolution systems. Considering the situation analyzed in FIG. 5 with $\tau$=1 μs and $\chi_{[P]}{}^m \sim 1.3 \times 10^{-9}$, we estimate that access jitter of order 1.5 ps may be tolerated before the total measured error exceeds the bound of $2\chi_{[P]}{}^m$. Since current digital delay generators allow for sub-ps timing resolution and ps jitter, the requisite timing accuracy is nevertheless within reach with existing technologies.

We next address different aspects of the assumed noise model. Consider first the assumption of a hard spectral cutoff in bounding the long-storage-time error. If such an assumption is not obeyed (hence residual noise persists beyond $\omega_c$), it is impossible to fully avoid the singular behavior introduced by the periodic modulation as $m \to \infty$. Contributions from the resonating region $\omega \approx \omega_{res}$ are amplified with m, and, similar to pulse-errors, cause $\chi_{[P]}{}^\infty$ to increase unboundedly with time and coherence to ultimately decay to zero.

Nonetheless, a very large number of repetitions, $m_{max}$, may still be applied before such contributions become important (note that this is the case in the previous figures, where we assume a soft Gaussian cute). We lower-bound $m_{max}$ by considering a scenario in which a plateau is preserved with a hard cutoff and estimating when contributions to error for frequencies $\omega > \omega_c$ become comparable to the plateau error.

For simplicity, we assume that noise for $\omega > \omega_c$ falls in the passband of the FF and that at $\omega = \omega_c$ the noise power law changes from of $\omega^s \to \omega^{-r}$, with r>0. Treating such a case with s=2 and using again repeated CDD$_4$ with $\tau$=1 μs as in FIG. 5, we find that as long as r is sufficiently large, the plateau error $\chi_{[P]}{}^m \sim 10^{-9}$ can persist for $m_{max} \gtrsim 10^4$-$10^6$ repetitions (that is, up to a storage time of over 10 s), before the accumulated error due to high-frequency contributions exceeds the plateau coherence (see Methods).

This makes it possible to engineer a coherence plateau over an intermediate, range of $T_s$ which can still be exceptionally long from a practical standpoint, depending on the specific rolloff behavior of $S(\omega)$ at frequencies beyond $\omega_c$. Such an example is also referred to as having a deterioration that is bounded to an upper deterioration limit since the deterioration is bounded for any practical purpose of storing the quantum state.

Lastly, we turn to consideration of more general open-system models. For instance, consider a system-bath interaction which includes both a dominant dephasing component and an "off-axis" perturbation, resulting in energy relaxation with a characteristic timescale $T_1$. Then the initial dephasing dynamics, including the onset of a coherence plateau, will not be appreciably modified so long as these two noise sources are uncorrelated and there is a sufficient separation of time scales. If $T_1 \gg T_2$, and the maximum error per cycle is kept sufficiently small, the plateau will persist until uncorrected $T_1$ errors dominate $\chi_{[P]}{}^m$.

We reiterate that in many experimentally relevant settings—notably, both trapped-ion and spin qubits—$T_1$ effects may indeed be neglected up to very long storage times. In some examples, stochastic error sources due, for instance, to spontaneous emission processes and/or Markovian noise (including white control noise) may form a limiting mechanism. In such circumstances, the unfavorable exponential scaling of Markovian errors with storage time poses a problem for high-fidelity storage through DD alone.

Given a simple exponential decay with time-constant $T_M$ and assuming that Eq. (4) is met, we may estimate a maximum allowed plateau duration as $T_{max} \approx T_M \chi_{[p]}^\infty$. Thus, even with $T_M=100$ s, a plateau $\chi_{[p]}^\infty=10^{-5}$ would terminate after $T_{max}=1$ ms. Guaranteeing high-fidelity quantum memory through DD may require Markovian noise sources to be minimized.

The potential performance provided by our approach is quite remarkable. Besides the illustrative error calculations we have already presented, we find that many other interesting scenarios arise where extremely low error rates can be achieved in realistic noise environments for leading quantum technologies.

For instance, Ytterbium ion qubits, of direct relevance to applications in quantum repeaters, allow long-time, low-error coherence plateaus at the timescale of hours, based on bare lee-induction-decay (1/e) times of order seconds [40]. Calculations using a common $1/\omega$ noise power spectrum with $CDD_2$, a Gaussian high-frequency cutoff near 100 Hz, $\tau=1$ ms, and DCG operations with $\tau_\pi=10$ µs, give an estimate of the plateau error rate of $2.5\times 10^{-9}$. This kind of error rate and the corresponding access latency of just 4 ms—has the potential to truly enable viable quantum memories for repeater applications.

Similarly, the calculations shown throughout this disclosure rely on the well-characterized noise power spectrum associated with nuclear spin fluctuations in spin qubits. Appropriate sequence construction and timing selection [42] permits the analytical criteria set out in Eq. (3) to be met, and similar error rates to be achieved.

In summary, we have addressed a fundamental and timely problem in quantum information processing—determining a means to effectively produce a practically useful high-fidelity quantum memory, by using dynamical error suppression techniques. We have identified the key requirements towards this end, and developed a strategy for sequence construction based on repetition of high-order DD base sequences. Our results allow analytical bounding of the long-time error rates to an upper deterioration limit and identify conditions in which a maximum error rate can be stroboscopically guaranteed for long times with small access latencies, even in the presence of limited control. We have validated these insights and analytic calculations using an efficient search over Walsh DD sequences assuming realistic noise spectra.

From a practical perspective, our analyses help set technological targets on parameters such as error-per-pulse, timing resolution, and Markovian noise strengths required to achieve the full benefits of our approach to quantum memory. This work also clearly shows how a system designer may calculate the impact of such imperfections for a specific platform, bound performance, and examine technological trade-offs in attempting to reach a target memory fidelity and storage time. As the role of optimization in any particular setting is limited to finding a low-error sequence of duration $T_p$ to be repeated up to $T_s$, our framework dramatically reduces the complexity of finding high-performance DD protocols.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Likewise, we remark that our approach naturally applies to multiple qubits subject to dephasing from independent environments. Since expressions similar to the spectral overlap integral still determine the decay rates of different coherence elements [44], exact DD can be achieved by simply replacing individual with collective $\pi$ pulses, and conditions similar to Eq. (2) may then be separately envisioned to ensure that each coherence element saturates, again resulting in a guaranteed high storage fidelity. The role of correlated dephasing noise and/or other realistic effects in multi-qubit long-time storage may also be addressed.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating" or "generating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

REFERENCES

[1] L. Viola and S. Lloyd, "Dynamical suppression of deco-herence in two-state quantum systems," Phys. Rev. A 58, 2733-2744 (1998).
[2] L. Viola, E. Knill, and S. Lloyd, "Dynamical decoupling of open quantum systems," Phys. Rev. Lett. 82, 24172421 (1999).
[3] K. Khodjasteh and D. A. Lidar, "Fault-tolerant quantum dynamical decoupling," Phys. Rev. Lett. 95, 180501/1-4 (2005).
[4] G. S. Uhrig, "Keeping a quantum bit alive by optimized pi-pulse sequences," Phys. Rev. Lett. 98, 100504/1-4 (2007).
[5] K. Khodjasteh and L. Viola, "Dynamically Error-Corrected gates for universal quantum computation," Phys. Rev. Lett. 102, 080501/1-4 (February 2009).
[6] K. Khodjasteh, D. A. Lidar, and L. Viola, "Arbitrarily accurate dynamical control in open quantum systems," Phys. Rev. Lett. 104, 090501/1-4 (March 2010).
[7] J. True Merrill and K. R. Brown, "Progress in compensating pulse sequences for quantum computation," Preprint at (http://arxiv.org/abs/1203.6392)(2013).
[8] M. J. Biercuk, H. Uys, A. P. VanDevender, N. Shiga, W. M. Itano, and J. J. Bollinger, "Optimized dynamical decoupling in a model quantum memory," Nature 458, 996-1000 (2009).
[9] H. Uys, M. J. Biercuk, and J. J. Bollinger, "Optimized noise filtration through dynamical decoupling," Phys. Rev. Lett. 103, 040501/1-4 (2009).
[10] Y. Sagi, I. Almog, and N. Davidson, "Process tomography of dynamical decoupling in a dense cold atomic ensemble," Phys. Rev. Lett. 105, 053201/1-4 (2010).

[11] I. Almog, Y. Sagi, G. Gordon, G. Bensky, G. Kurizki, and N. Davidson, "Direct measurement of the system-environment coupling as a tool for understanding decoherence and dynamical decoupling," J. Mod. Phys. 44, 154006/1-9 (2011).

[12] S. Foletti, H. Bluhm, D. Mahalu, V. Umansky, and A. Yacoby, "Universal quantum control of two-electron spin quantum bits using dynamic nuclear polarization," Nature Phys. 5, 903-908 (2009).

[13] H. Bluhm, S. Foletti, I. Neder, M. Rudner, D. Mahalu, V. Umansky, and A. Yacoby, "Dephasing time of gas electron-spin qubits coupled to a nuclear bath exceeding 200 mu s," Nature Phys. 7, 109-113 (2011).

[14] M. D. Shulman, O. E. Dial, S. P. Harvey, H. Bluhm, V. Umansky, and A. Yacoby, "Demonstration of entanglement of electrostatically coupled singlet-triplet qubits," Science 336, 202-205 (2011).

[15] C. Barthel, J. Medford, C. M. Marcus, M. P. Hanson, and A. C. Gossard, "Interlaced dynamical decoupling and coherent operation of a singlet-triplet qubit," Phys. Rev. Lett. 105, 266808/1-4 (2010).

[16] J. Medford, L. Cywinski, C. Barthel, C. M. Marcus, M. P. Hanson, and A. C. Gossard, "Scaling of dynamical decoupling for spin qubits," Phys. Rev. Lett. 108, 086802/1-4 (2012).

[17] A. M. Tyryshkin, Z.-H. Wang, W. Zhang, E. E. Haller, J. W. Ager, V. V. Dobrovitski, and S. A. Lyon, "Dynamical decoupling in the presence of realistic pulse errors," Preprint at (http://arxiv.org/abs/1011.1903>(2010).

[18] Z.-H. Wang, W. Zhang, A. M. Tyryshkin, S. A. Lyon, J. W. Ager, E. E. Haller, and V. V. Dobrovitski, "Effect of pulse error accumulation on dynamical decoupling of the electron spins of phosphorus donors in silicon," Phys. Rev. B 85, 085206/1-12 (2012).

[19] G. de Lange, Z.-H. Wang D. Riste, V. V. Dobrovitski, and R. Hanson, "Universal dynamical decoupling of a single solid-state spin from a spin bath," Science 330, 60-63 (2010).

[20] C. A. Ryan, J. S. Hodges, and D. G. Cory, "Robust de-coupling techniques to extend quantum coherence in diamond," Phys. Rev. Lett. 105, 200402/1-4 (2010).

[21] B. Naydenov, F. Dolde, L. T. Hall, C. Shin, H. Fed-der, L. C. L. Hollenberg, F. Jelezko, and J. Wrachtrup, "Dynamical decoupling of a single-electron spin at room temperature," Phys. Rev. B 83, 081201(R)/1-4 (2011).

[22] Z.-H. Wang, G. de Lange, D. Riste, R. Hanson, and V. V. Dobrovitski, "Comparison of dynamical decoupling protocols for a nitrogen-vacancy center in diamond," Phys. Rev. B 85, 155204/1-45 (2012).

[23] D. Hayes, S. M. Clark, S. Debnath, D. Hucul, I. V. Inlek, K. W. Lee, Q. Quraishi, and C. Monroe, "Coherent error suppression in multiqubit gates," Phys. Rev. Lett. 109, 020503/1-4 (2012).

[24] M. J. Biercuk, A. C. Doherty, and H. Uys, "Dynamical decoupling sequence construction as a filter-design problem," J. Phys. B 44, 154002/1-7 (2011).

[25] M. Palma, K.-A. Suominen, and A. K. Ekert, "Quantum computers and dissipation," Proc. R. Soc. London A 452, 567-584 (1996).

[26] L. Cywinski, R. M. Lutchyn, C. P. Nave, and S. Das Sarma, "How to enhance dephasing time in superconducting qubits," Phys. Rev. B 77, 174509/1-11 (2008).

[27] T. Hodgson, L. Viola, and I. D'Amico, "Towards optimized suppression of dephasing in systems subject to pulse timing constraints," Phys. Rev. A 81, 062321/1-16 (2010).

[28] K. Khodjasteh, T. Erdelyi, and L. Viola, "Limits on preserving quantum coherence using multipulse control," Phys. Rev. A 83, 020305/1-4 (2011).

[29] D. Hayes, K. Khodjasteh, L. Viola, and M. J. Biercuk, "Reducing sequencing complexity in dynamical quantum error suppression by Walsh modulation," Phys. Rev. A 84, 062323/1-13 (2011).

[30] T. Yuge, S. Sasaki, and Y. Hirayama, "Measurement of the noise spectrum using a multiple-pulse sequence," Phys. Rev. Lett. 107, 170504/1-4 (2011).

[31] A. Ajoy, G. A. Alvarez, and D. Suter, "Optimal pulse spacing for dynamical decoupling in the presence of a purely dephasing spin bath," Phys. Rev. A 83, 032303/114 (2012).

[32] M. A. Souza, G. A. Alvarez, and D. Suter, "Robust dy-namical decoupling for quantum computing and quantum memory," Phys. Rev. Lett. 106, 240501/1-4 (2011).

[33] J. Rutman, "Characterization of phase and frequency in-stabilities in precision frequency sources 15th years of progress," Proc. IEEE 66, 1048-1075 (1978).

[34] A. G. Kofman and K. Kurizki, "Universal dynamical control of quantum mechanical decay: Modulation of the coupling to the continuum," Phys. Rev. Lett. 87, 270405/1-4 (2001).

[35] T. J. Green, H. Uys, and M. J. Biercuk, "High-order noise filtering in nontrivial quantum logic gates," Phys. Rev. Lett. 109, 020501/1-4 (2012).

[36] M. J. Biercuk and H. Bluhm, "Phenomenological study of decoherence in solid-state spin qubits due to nuclear spin diffusion," Phys. Rev. B 83, 235316/1-10 (2011).

[37] G. S. Uhrig and D. A. Lidar, "Rigorous bounds for optimal dynamical decoupling," Phys. Rev. A 82, 012301 (2010).

[38] L. Viola and E. Knill, "Random decoupling schemes for quantum dynamical control and error suppression," Phys. Rev. Lett. 94, 060502/1-4 (2005).

[39] L. F. Santos and L. Viola, "Enhanced convergence and robust performance of randomized dynamical decoupling," Phys. Rev. Lett. 97, 150501/1-4 (2006).

[40] L.-M. Duan and C. Monroe, "Colloquium: Quantum net-works with trapped ions," Rev. Mod. Phys. 82, 1209-1224 (2010).

[41] T. J. Green, J. Sastrawan, H. Uys, and M. J. Biercuk, "Arbitrary quantum control of qubits in the presence of universal noise," Preprint at (http://arxiv.org/abs/1211.1163>(2013).

[42] K. Khodjasteh, H. Bluhm, and L. Viola, "Automated synthesis of dynamically corrected quantum gates," Phys. Rev. A 86, 042329/1-7 (2012).

[43] G. A. Alvarez, M. A. Souza, and D. Suter, "Iterative rotation scheme for robust dynamical decoupling," Phys. Rev. A 85, 052324/1-9 (2012).

[44] L.-M. Duan and G.-C. Guo, "Reducing decoherence in quantum-computer memory with all quantum bits coupling to, the same environment," Phys. Rev. A 57, 737741 (1998).

The invention claimed is:

1. A method for preserving a quantum state of a quantum system in a quantum memory, the method comprising:
determining based on a characteristic of noise that causes deterioration of the quantum state a dynamical decoupling base sequence
such that the duration of the base sequence is shorter than or equal to an access latency time of the quantum memory to allow access to the quantum state within the access latency time, and such that the deterioration of the quantum state is bounded to an upper deterioration limit when the base sequence is repeatedly applied to the quantum system.

2. The method of claim 1, further comprising repeatedly applying the base sequence to the quantum system.

3. The method of claim 1, wherein determining the base sequence is based on a filter function of the base sequence, the filter function of the base sequence characterising the filtering of the noise by the base sequence.

4. The method of claim 3, wherein the base sequence comprises multiple pulses and the filter function of the base sequence is based on time values of the multiple pulses.

5. The method of claim 3, wherein determining the base sequence is based on an order of error suppression of the filter function of the base sequence.

6. The method of claim 5, wherein determining the base sequence comprises selecting one of multiple base sequences such that the order of error suppression of the filter function of the selected base sequence is above a first minimum value that is based on the noise data.

7. The method of claim 5, wherein the noise data comprises a dominant exponent s in the noise power spectrum and the order of error suppression $\alpha_P$ of the filter function of the base sequence satisfies the constraint $s+2\alpha_P>1$.

8. The method of claim 3, wherein the base sequence comprises multiple instances of a pulse and the filter function of the base sequence is based on a filter function of the pulse, the filter function of the pulse characterising the influence of the pulse on the filtering of the noise.

9. The method of claim 8, wherein determining the base sequence is based on an order of error suppression of the filter function of the pulse.

10. The method of claim 9, wherein determining the base sequence comprises selecting one of multiple base sequences such that the order of error suppression of the pulse of the selected base sequence is above a second minimum value that is based on the noise data.

11. The method of claim 9, wherein the noise data comprises a dominant exponent s in the noise power spectrum and the order of error suppression $\alpha_{Pul}$ of the filter function of the pulse satisfies the constraint $s+2\alpha_{Pul}>1$.

12. The method of claim 1, wherein the noise data comprises a cut-off frequency of the noise and the duration of the base sequence is based on the cut-off frequency of the noise.

13. The method of claim 12, wherein determining the base sequence comprises selecting one of multiple base sequences such that the duration of the selected base sequence is below a second maximum value that is based on the cut-off frequency of the noise.

14. The method of claim 12, wherein the duration $T_p$ of the base sequence satisfies the constraint $T_p \omega_c < 2\pi$, with $\omega_c$ being the cut-off frequency of the noise.

15. The method of claim 1, wherein the base sequence is based on one or more Walsh functions.

16. A non-transitory computer readable medium with an executable program stored thereon that when executed causes the computer to perform the method of claim 1.

17. A non-transitory computer readable medium with a dynamical decoupling sequence stored thereon that when applied to a quantum system preserves a quantum state in the quantum system of a quantum memory having an access latency time, the sequence comprising:
multiple instances of a base sequence, the duration of the base sequence being shorter than or equal to the access latency time to allow access to the quantum state within the access latency time and having a configuration such that the deterioration of the quantum state is bounded to an upper deterioration limit when the base sequence is repeatedly applied to the quantum system.

18. A method for storing data in a quantum system of a quantum memory accessible within an access latency time, the method comprising:
receiving the data to be stored in the quantum memory;
creating a quantum state in the quantum memory to represent the data; and
applying a sequence of stimulation pulses to the quantum system to preserve the quantum state, wherein the sequence of stimulation pulses comprises multiple instances of a base sequence, the duration of the base sequence being shorter than or equal to the access latency time to allow access to the quantum state within the access latency time and having a configuration such that the deterioration of the quantum state is bounded to an upper deterioration limit when the base sequence is repeatedly applied to the quantum system.

* * * * *